United States Patent
Troianovski

(10) Patent No.: US 12,254,897 B1
(45) Date of Patent: Mar. 18, 2025

(54) DATA CARTRIDGE MAGAZINE AND LIBRARY SYSTEM

(71) Applicant: MagNext Ltd., Columbus, OH (US)

(72) Inventor: Dmitri Troianovski, San Diego, CA (US)

(73) Assignee: MagNext Ltd., Columbus, OH (US)

( * ) Notice: Subject to any disclaimer, the term of this patent is extended or adjusted under 35 U.S.C. 154(b) by 0 days.

(21) Appl. No.: 18/243,202

(22) Filed: Sep. 7, 2023

Related U.S. Application Data

(60) Provisional application No. 63/404,320, filed on Sep. 7, 2022.

(51) Int. Cl.
*G11B 17/038* (2006.01)

(52) U.S. Cl.
CPC .................................. *G11B 17/038* (2013.01)

(58) Field of Classification Search
None
See application file for complete search history.

(56) References Cited

U.S. PATENT DOCUMENTS

| | | | |
|---|---|---|---|
| 4,932,826 A | 6/1990 | Moy et al. | |
| 5,021,902 A * | 6/1991 | Ishikawa | G11B 15/681 414/331.14 |
| 5,164,909 A | 11/1992 | Leonhardt et al. | |
| 5,416,914 A | 5/1995 | Korngiebel et al. | |
| 5,449,229 A | 9/1995 | Aschenbrenner et al. | |
| 5,532,888 A * | 7/1996 | Acosta | G11B 15/6835 360/92.1 |
| 5,659,440 A | 8/1997 | Acosta et al. | |
| 5,832,213 A | 11/1998 | Duncan | |
| 5,867,458 A * | 2/1999 | Barkley | G11B 15/6825 |
| 5,926,341 A * | 7/1999 | Mueller | G11B 15/6825 |
| 5,927,834 A * | 7/1999 | Todor | G11B 15/6825 |
| 5,940,354 A | 8/1999 | Inoue | |
| 5,999,500 A | 12/1999 | Mueller | |
| 6,028,733 A * | 2/2000 | Schmidtke | G11B 15/6825 |

(Continued)

FOREIGN PATENT DOCUMENTS

WO WO-2011092826 A1 * 8/2011 ......... G11B 15/6835

OTHER PUBLICATIONS

"LTO Tape Libraries", Magstor Website, Web page <https://web.archive.org/web/20210921033437/https:/magstor.com/collections/libraries>, 3 pages, dated Sep. 21, 2021, retrieved from www.web.archive.org website on Oct. 30, 2024.

*Primary Examiner* — William J Klimowicz
(74) *Attorney, Agent, or Firm* — The Law Office of Patrick F. O'Reilly III, LLC

(57) ABSTRACT

Data cartridge magazines are disclosed herein. The disclosed data cartridge magazines comprise: a frame; a plurality of slots defined by the frame; and a plurality of locking elements. Each slot is configured to accept a data cartridge, and each locking element corresponds to one of the plurality of slots. Each locking element is operative in a locked and unlocked configuration. Each locking element is further configured to cooperate with the data cartridge when the data cartridge is inserted into the corresponding slot and the corresponding locking element is in the locked configuration. The locking element prevents removal of the data cartridge in the locked configuration and the locking element allows removal of the data cartridge in the unlocked configuration.

14 Claims, 5 Drawing Sheets

(56) References Cited

U.S. PATENT DOCUMENTS

| | | | |
|---|---|---|---|
| 6,061,321 A | 5/2000 | Kanetsuku et al. | |
| 6,330,489 B1 | 12/2001 | Iwakawa | |
| 6,338,006 B1 | 1/2002 | Jesionowski et al. | |
| 6,347,020 B1 | 2/2002 | Carpenter et al. | |
| 6,396,658 B1 * | 5/2002 | Iwabuchi | G11B 17/225 |
| 6,411,462 B1 | 6/2002 | Ostwald et al. | |
| 7,116,506 B1 | 10/2006 | Mojica | |
| 7,136,988 B2 | 11/2006 | Gallo | |
| 7,580,220 B1 * | 8/2009 | Grow | G11B 33/0438 360/92.1 |
| 9,293,167 B2 * | 3/2016 | Masuda | G11B 15/6835 |
| 11,200,194 B1 | 12/2021 | Mindlin | |
| 11,887,625 B1 | 1/2024 | Saliba | |
| 11,892,961 B1 | 2/2024 | Mindlin | |
| 2001/0020197 A1 | 9/2001 | Nakano et al. | |
| 2004/0021978 A1 | 2/2004 | Flaherty et al. | |
| 2004/0021979 A1 | 2/2004 | Flaherty et al. | |
| 2010/0270186 A1 | 10/2010 | Ishii | |
| 2012/0286633 A1 * | 11/2012 | Hashimoto | G11B 15/6835 312/215 |
| 2013/0181794 A1 | 7/2013 | Ostwald et al. | |
| 2018/0267717 A1 | 9/2018 | Miranda Gavillan et al. | |

* cited by examiner

DATA CARTRIDGE MAGAZINE AND LIBRARY SYSTEM

CROSS-REFERENCE TO RELATED APPLICATIONS

This patent application claims priority to, and incorporates by reference in its entirety, U.S. Provisional Patent Application No. 63/404,320, entitled "DATA CARTRIDGE MAGAZINE AND LIBRARY SYSTEM", filed on Sep. 7, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to computer peripheral devices. More particularly, the present invention relates to a data cartridge magazine used by an automated data library.

Background and Description of Related Art

Peripheral devices for use with computer systems are well known. Common peripheral devices include printers, monitors, and disk drives. In some cases, users need a way to back up and/or store a massive amount of data. A set of magnetic tape or other data cartridges has long been a preferred medium for such large data stores.

A popular device for handling such large amounts of information in a data processing system is an automated data cartridge library. Data cartridge libraries store and manage multiple cartridges containing storage media on which data is stored. Data cartridge libraries typically include a plurality of fixed data cartridge storage locations, at least one read/write drive, and a cartridge retrieval/transport mechanism, known in the art as a "cartridge picker."

The robotic cartridge picker can remove a data cartridge from the magazine and insert it in a drive to store or retrieve data from the cartridge. Cartridge pickers automatically exchange individual data cartridges between the storage locations and the drive(s). One example of a cartridge picker includes a rotatable robotic arm with an optical sensor for selecting and retrieving a data cartridge and transporting the data cartridge between a physical storage location and a drive(s). Another example of a cartridge picker includes a linear robotic mechanism that moves along an X-Y translation or about a pivot in a rotary motion to select, retrieve, and transport data cartridges to the tape drive(s).

The drive(s) is typically mounted within or juxtaposed to the cartridge library. The drive(s) is operable to read/write data to or from the media in the cartridge. A host computer communicates with a library control unit and the drive(s) to control the operation of the tape cartridge library.

In typical libraries, the cartridge storage locations are arranged in predetermined arrays of uniquely identified slots with each slot containing a single data cartridge. In some cases, the array of slots is configured in a bookshelf arrangement. This type of arrangement requires the use of a multi-axis cartridge picker that translates along an x, y, and/or z axis to exchange individual cartridges with the drive(s).

When a data transfer operation is done, the data cartridge is put back in the magazine for further use. Such automated libraries essentially replace human operation. There are a number of prior art magazine implementations, where the cartridges can be horizontal or vertical and cartridges can be inserted in one side or both sides.

The present application recognizes that such automated cartridge libraries suffer from numerous drawbacks. One significant drawback is the physical security of the data cartridges. Through software controls, the cartridge picker may select and transport any identified cartridge. In certain environments, it would be advantageous to employ physical security to prevent the transport of one or more highly sensitive cartridges unless authorized by an on-site human operator.

Accordingly, there is a need to physically lock a data cartridge in place to prevent transport by an automated cartridge picker.

SUMMARY OF EXAMPLE EMBODIMENTS

Accordingly, the present invention is directed to an improved data library system and cartridge magazine for use in a data library system that substantially obviates one or more problems resulting from the limitations and deficiencies of the related art.

According to a first embodiment of the present application, Applicant discloses a data library system comprising a cartridge magazine. The cartridge magazine comprises: a frame; a plurality of slots defined by the frame, each slot configured to accept a data cartridge; a plurality of locking elements, each locking element corresponding to one of the plurality of slots, each locking element operative in a locked and unlocked configuration; each locking element further configured to cooperate with the data cartridge when the data cartridge is inserted into the corresponding slot and the corresponding locking element is in the locked configuration; and whereby the locking element prevents removal of the data cartridge in the locked configuration and the locking element allows removal of the data cartridge in the unlocked configuration.

BRIEF DESCRIPTION OF THE DRAWINGS

The invention will now be described, by way of example, with reference to the accompanying drawings, which are incorporated in and constitute a part of the specification, in which.

DRAWING REFERENCE NUMERALS

Figure 1:
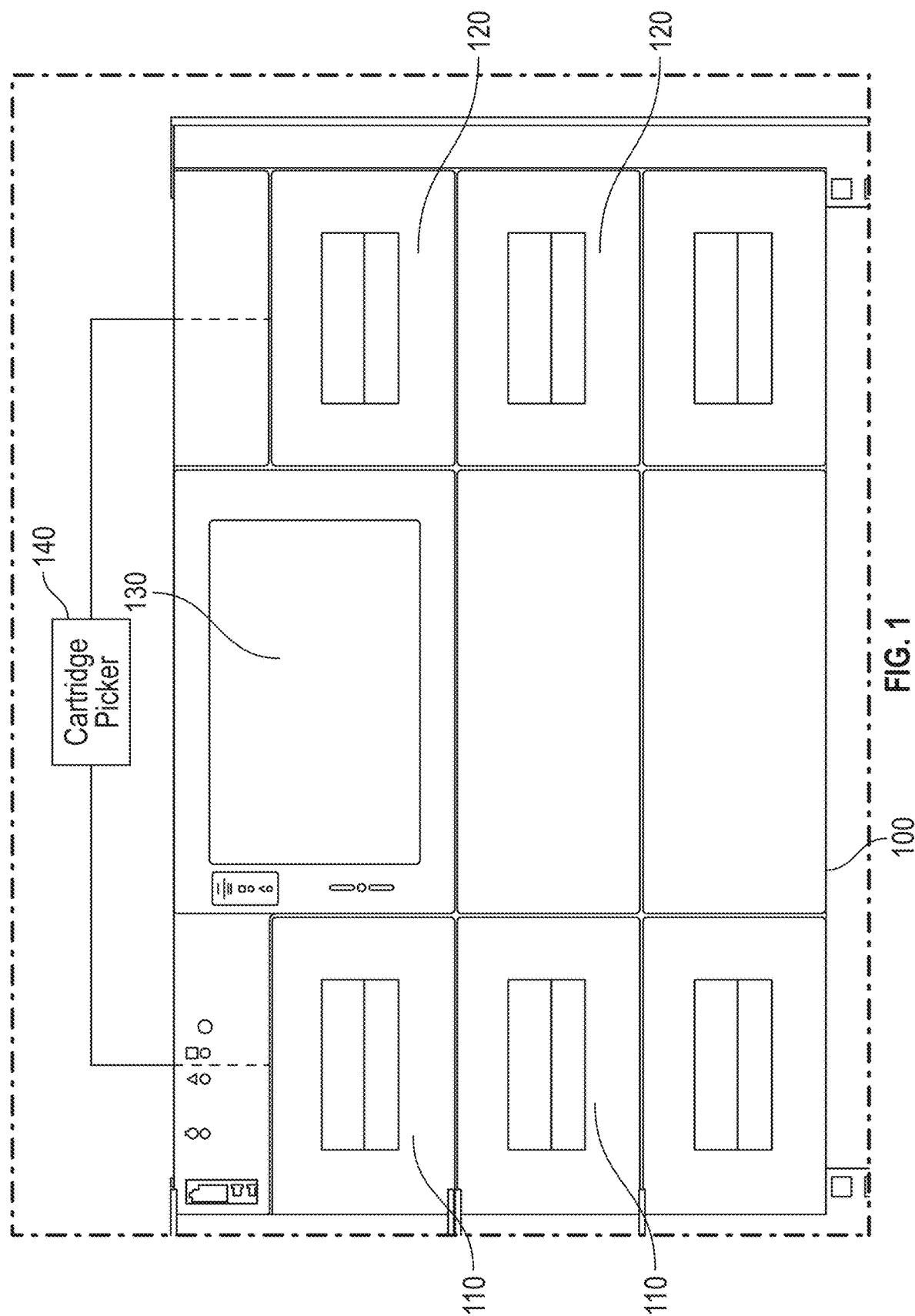
FIG. 1 is a front view of an example cartridge library device.

The following reference characters identify the associated elements depicted in the drawings describing the present invention:

| | |
|---|---|
| 100 Example Cartridge Library | 310 Cartridge Slot |
| 110 Left Cartridge Magazine | 410 Data Cartridge |
| 120 Right Cartridge Magazine | 420 Notch |
| 130 Control Panel | 510 Example Detent Element |
| 210 Right Cartridge Magazine Key | 610 Example Locking Element |

DETAILED DESCRIPTION

To address the deficiencies of the prior art, the present application discloses an improved cartridge magazine for use in a tape library system. The cartridge magazine of the present application embodies several improvements over the prior art. According to one aspect of the present application, the disclosed cartridge magazine comprises a locking element that provides an operator physical control over a data cartridge. According to another aspect of the present application, the disclosed cartridge magazine restricts access to the cartridge until the magazine is opened.

A significant advantage of the disclosed cartridge magazine and library system is that when an operator completes data transfer to a cartridge and wants to protect the data, he inserts the cartridge in this disclosed cartridge magazine. The magazine is designed to allow the automated picker to insert the cartridge and lock it in so the picker cannot take the cartridge out, much like a door lock when you close it. Just like the door, where a human must manipulate the handle to open the door, the disclosed cartridge magazine requires a human to remove the cartridge. So unlike current magazines, a malicious hacker cannot command the picker to remove the cartridge as the disclosed magazine locks the cartridge. The magazine provides a standard library with the option of keeping important data away from hackers. In one embodiment, the disclosed locking element can be employed in all slots of a magazine or in selected slots.

One of ordinary skill will recognize that the disclosed cartridge magazine will work equally well with removable cartridges regardless of the storage media. The disclosed magazine cartridge will work with libraries of tape cartridges, CDs, DVDs, and other storage media.

Figure 4:
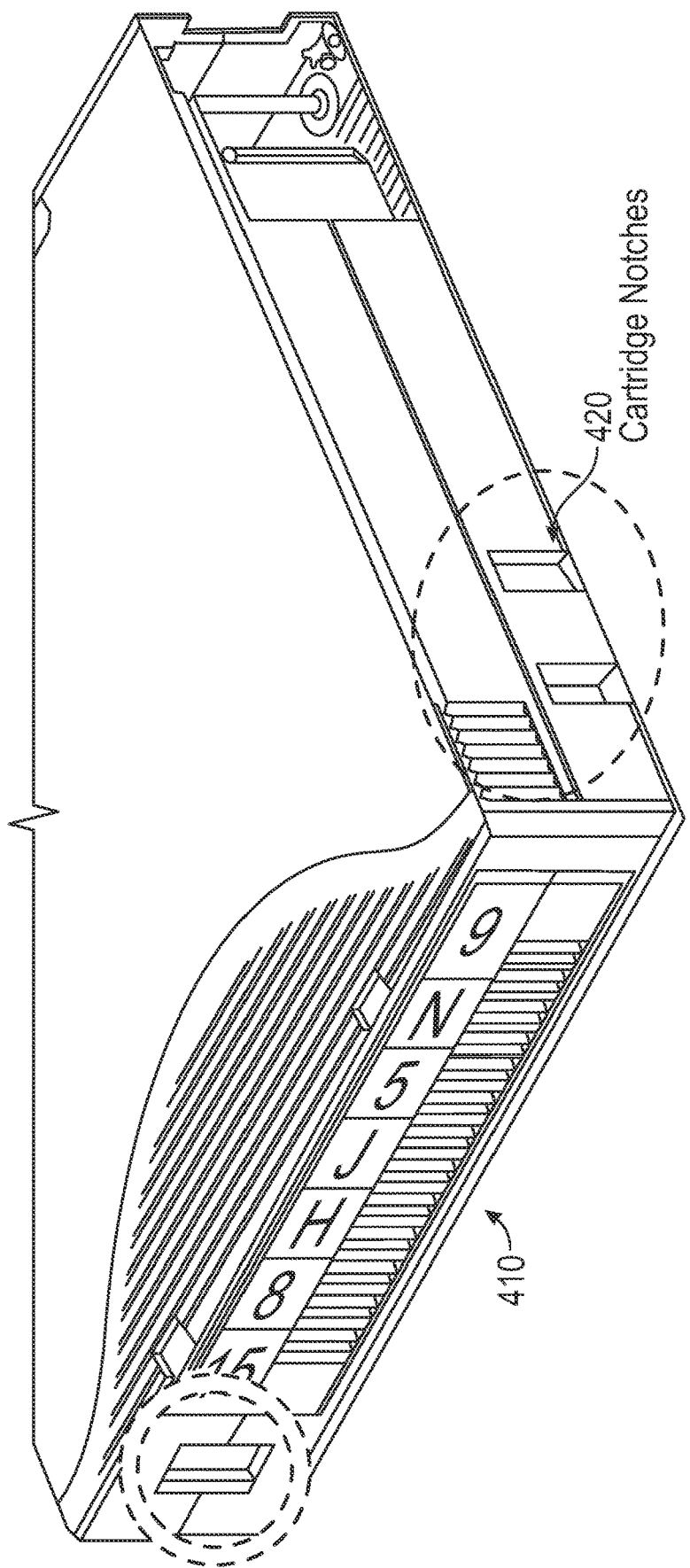
FIG. 4 is a orthographic view of an example data cartridge.

Referring now to FIG. 1, there is shown an orthographic view of an example cartridge library 100. Example cartridge library 100 comprises three (3) left side cartridge magazines 110 and three (3) right side cartridge magazines 120 to physically store a plurality of data cartridges 410, as shown in FIG. 4. Cartridge magazines 110 and 120 are removable from the example cartridge library 100 as necessary to insert, remove, and/or replace data cartridges stored therein.

Example cartridge library 100 further comprises a control panel 130 for controlling the operation of the example cartridge library 100. Example cartridge library 100 may comprise a conventional cartridge library except for the improvements set forth herein.

Figure 2:
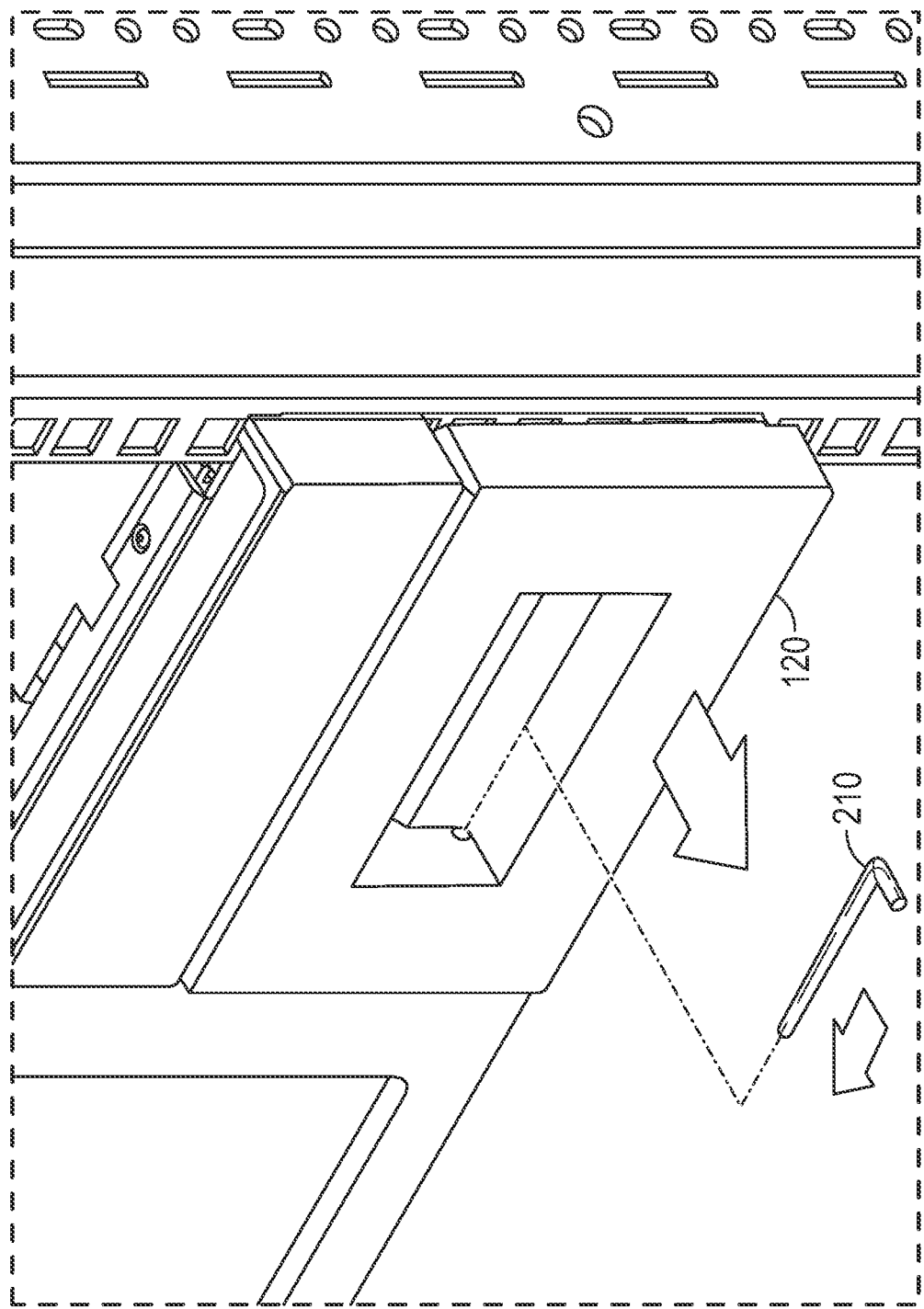
FIG. 2 is a magnified orthographic view of an example cartridge magazine of the example cartridge library device of FIG. 1.

Referring now to FIG. 2, there is shown a magnified orthographic view of a right side cartridge magazine 120 inserted into the example cartridge library 100. The right side cartridge magazine 120 comprises a manual lock to secure the magazine and any data cartridges stored therein. An operator can lock and unlock the right side cartridge magazine 120 using a key 210. While the locking capability prevents unauthorized personnel from physically accessing any data cartridges stored within the right side cartridge magazine 120, data stored on the data cartridges may still be accessible using the standard functions of the example cartridge library 100.

Figure 3:
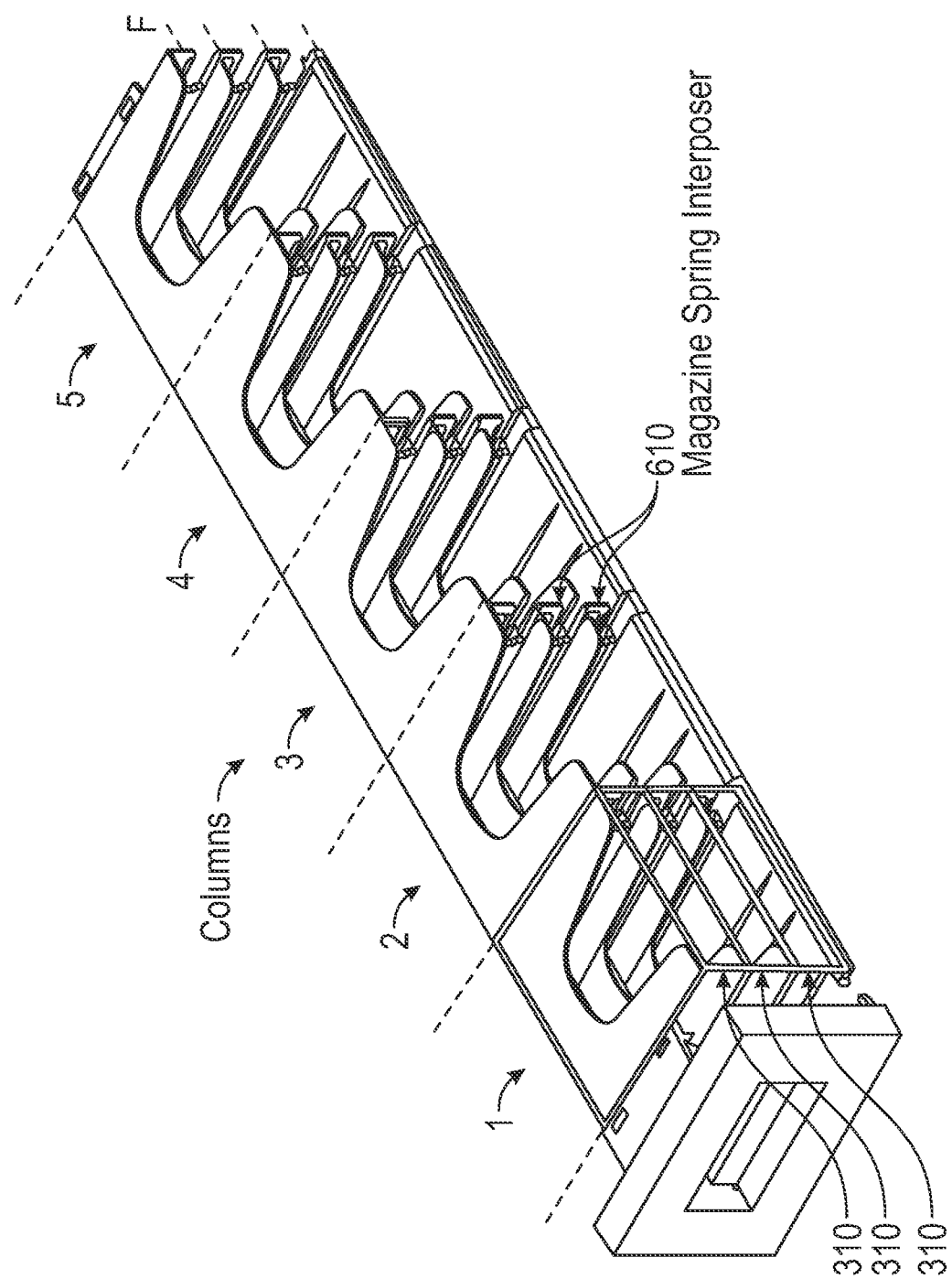
FIG. 3 is a orthographic view of the example cartridge magazine of FIG. 2.

Referring now to FIG. 3, there is shown an orthographic view of a left side cartridge magazine 110 completely removed from the example cartridge library 100. As illustrated in FIG. 3, left side cartridge magazine 110 comprises a plurality of slots 310. Each slot 310 is configured to physically receive and store a data cartridge 410. The left side cartridge magazine 110 further comprises a plurality of locking elements 610. Each locking element 610 is associated with a slot 310, and each locking element is operative to physically lock a cartridge 410 in the associated slot 310.

Referring now to FIG. 4 there is depicted an orthographic view of a conventional data cartridge 410. The outer casing of the data cartridge 410 forms multiple notches 420 which can be used to secure the cartridge 410 within a slot 310. Conventional slots typically have conventional detent elements 510, shown in more detail with reference to FIG. 5, immediately below.

Figure 5:
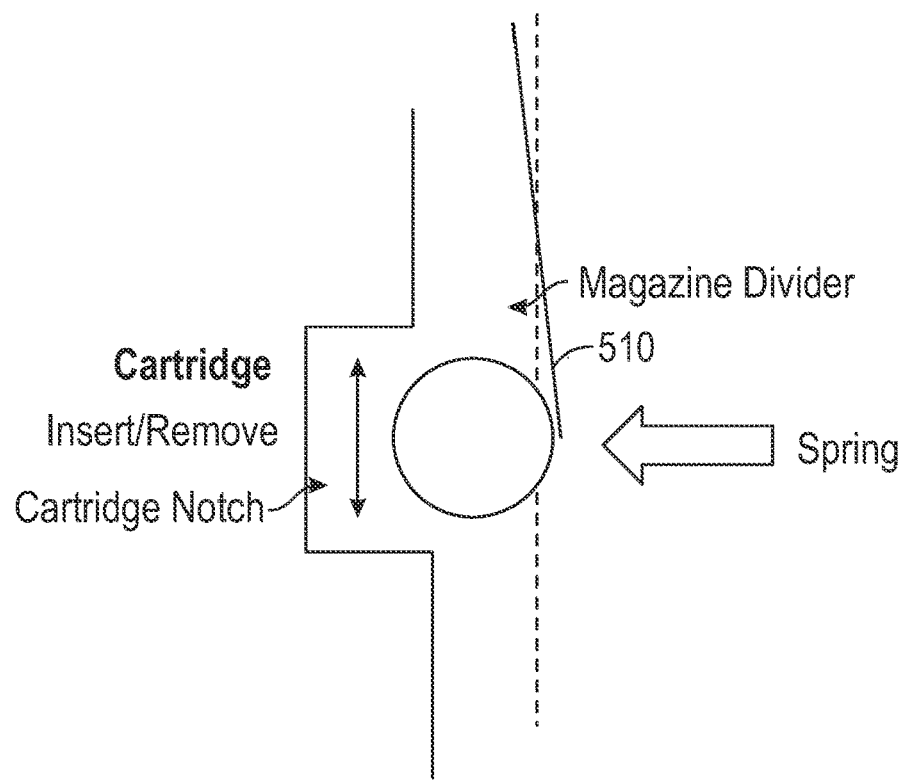
FIG. 5 is a schematic diagram of an example detent element.

Referring now to FIG. 5 there is depicted a schematic diagram of a conventional detent element 510 which operates to stabilize and temporarily secure the cartridge 410 within the slot 310. The conventional detent element 510 does not prevent or otherwise impede removal of the cartridge 410 from the slot 310.

Figure 6:
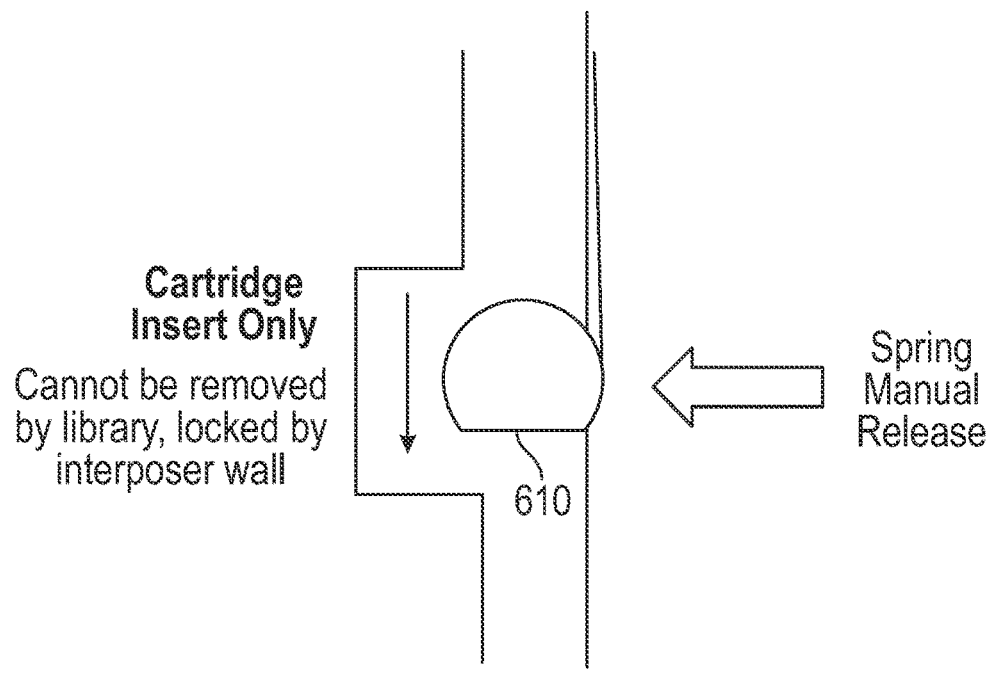
FIG. 6 is a schematic diagram of an example locking element according to the present application.

Referring now to FIG. 6 there is depicted a schematic diagram of novel locking element 610 which operates not only to stabilize the cartridge 410 within the slot 310, but also to prevent removal of the cartridge 410 from the slot 310. Once the cartridge 410 is in operation to store/retrieve data, the tape library 100 may place the cartridge 410 into a slot 310 which is configured with a locking element 610. Once the locking element 610 is engaged, the cartridge 410 is locked in the magazine until an operator manually unlocks the locking element 610. In this way, the cartridge is prevented from being reused by the tape library 100 because the automated picker 140 (see FIG. 1) is unable to remove the locked cartridge 410. As shown in FIG. 6, the locking element 610 comprises a spring loaded locking mechanism.

The mechanism (e.g., locking element 610) used to lock the cartridge in the magazine is a mechanical function. The mechanism allows the cartridge to be inserted in the slot by the automated picker, but not removed. Conventional magazines allow the automated picker to store and retrieve the cartridge. A tape library employing a cartridge magazine comprising the novel locking element secures access to the cartridge.

The mechanism (e.g., locking element 610) locks the cartridge in the magazine so the automated picker cannot retrieve the cartridge. The only way the cartridge can be removed, is for the operator to take out the magazine and manually unlock the locking element (interposer) to allow the cartridge to be removed. One of ordinary skill in the art will recognize that there may be many different embodiments that allow the cartridge to be inserted by the robot while preventing retrieval. One example embodiment has been described herein. The example embodiment has the advantage that use of a mechanical interposer is elegantly simple.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A cartridge magazine comprising:
   a frame;
   a plurality of slots defined by the frame, each slot configured to accept a data cartridge;
   a plurality of locking elements, each locking element corresponding to one of the plurality of slots, each locking element operative in a locked and unlocked configuration; each locking element further configured to cooperate with the data cartridge when the data cartridge is inserted into the corresponding slot and the corresponding locking element is in the locked configuration;
   whereby the locking element prevents removal of the data cartridge in the locked configuration and the locking element allows removal of the data cartridge in the unlocked configuration; and
   whereby, when the corresponding locking element is in the locked configuration, the data cartridge is able to be inserted into the corresponding slot by a cartridge picker of a cartridge library, but the data cartridge is unable to be removed from the corresponding slot by the cartridge picker of the cartridge library.

2. The cartridge magazine of claim 1 wherein the data cartridge comprises a tape data cartridge.

3. The cartridge magazine of claim 1 wherein the data cartridge comprises an LTO data cartridge.

4. The cartridge magazine of claim 1 wherein the data cartridge comprises an optical disk storage cartridge.

5. The cartridge magazine of claim 1 wherein the locking element is automatically configured in the locked configuration unless an operator configures the locking element in the unlocked configuration.

6. The cartridge magazine of claim 1 wherein the locking element comprises a spring loaded locking mechanism.

7. The cartridge magazine of claim 1 wherein the locking element is configured into the unlocked configuration using a mechanical key.

8. The cartridge magazine of claim 1 wherein the slot receives the data cartridge from a first side and the slot ejects the data cartridge to a second side.

9. A system comprising the cartridge magazine of claim 8 and further comprising a cartridge picker, wherein the cartridge picker is disposed on the first side.

10. The cartridge magazine of claim 1 wherein the cartridge picker can insert the data cartridge into the slot, but the data cartridge cannot be removed from the cartridge magazine unless the cartridge magazine is removed from the cartridge library.

11. The cartridge magazine of claim 1 wherein at least one of the plurality of slots is not paired with a corresponding locking element.

12. The cartridge magazine of claim 1 wherein the locking element comprises a body portion and the data cartridge comprises a notch, the body portion of the locking element enabling the data cartridge to be inserted into the corresponding slot by the cartridge picker of the cartridge library, but the body portion of the locking element preventing a removal of the data cartridge from the corresponding slot by the cartridge picker of the cartridge library once the body portion of the locking element is engaged within the notch of the data cartridge.

13. The cartridge magazine of claim 12 wherein the notch of the data cartridge comprises one or more side walls, and the body portion of the locking element comprises a first curved surface and a second flat surface, the first curved surface of the body portion being oppositely disposed relative to the second flat surface of the body portion;
   wherein the first curved surface of the body portion of the locking element enables the data cartridge to be inserted into the corresponding slot by the cartridge picker of the cartridge library, while an engagement between the second flat surface of the body portion of the locking element and a first one of the one or more side walls of the notch prevents the data cartridge from being removed from the corresponding slot by the cartridge picker of the cartridge library.

14. The cartridge magazine of claim 13 wherein the body portion of the locking element is semi-circular in shape; and
   wherein, when the body portion of the locking element is engaged within the notch of the data cartridge, the first curved surface of the body portion faces a second one of the one or more side walls of the notch, and the second flat surface of the body portion faces the first one of the one or more side walls of the notch.

* * * * *